Nov. 13, 1962 H. L. BRANDENBURG ETAL 3,063,393
WELDING APPARATUS
Filed Dec. 4, 1957
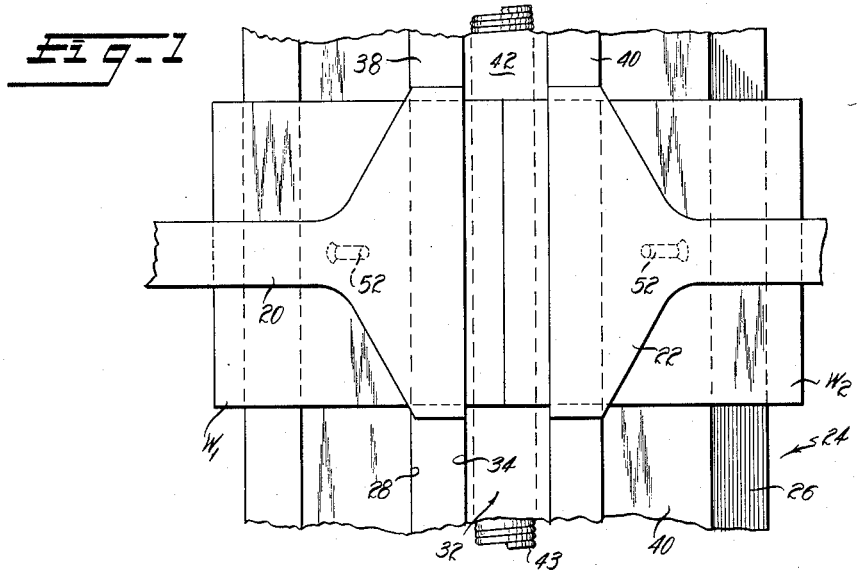
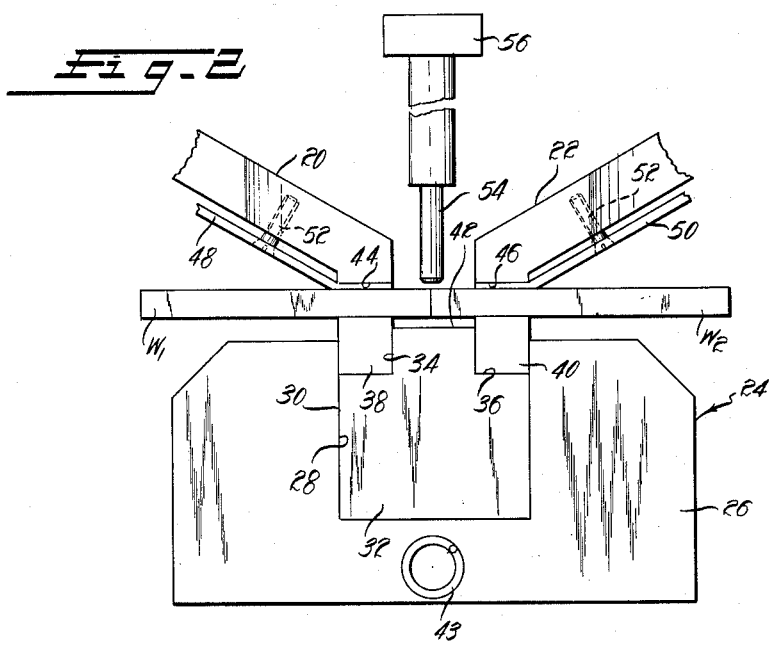
INVENTORS
RICHARD LAVENDER
HENRY L. BRANDENBURG
BY
ATTORNEYS

United States Patent Office 3,063,393
Patented Nov. 13, 1962

3,063,393
WELDING APPARATUS
Henry L. Brandenburg, Ionia, and Richard Lavender, Greenville, Mich., assignors to Hupp Corporation, Cleveland, Ohio, a corporation of Virginia
Filed Dec. 4, 1957, Ser. No. 700,663
2 Claims. (Cl. 113—136)

This invention relates to welding apparatus and more particularly to apparatus for supporting and clamping work pieces during the welding operation.

The invention has found particular utility in connection with the butt welding of two sheets or strips of hot short material, although the invention is of broader utility and wider application.

In accordance with prior practice, such sheets have been welded while they are held in the desired edge-to-edge relationship by copper clamps which also serve as one of the electrodes. While this arrangement has proved relatively satisfactory for a number of metals, it cannot be used successfully for the welding of so-called hot short metals. It has been found that when hot short materials are welded the resulting weld is of low strength and is often severely cracked.

It is the principal purpose and object of the present invention to provide improved welding apparatus, particularly adapted for welding hot short metals which overcomes the disadvantages of the prior art and permits the achievement of weldments which have high strength and are free of defects.

It is also an object to provide improved work holding apparatus for welders which effectively control the rate of cooling of the parent metal and the weld metal to provide sound, strong welds particularly in hot short materials.

It is a more specific object of the present invention to provide a composite work clamp assembly including metals having widely different thermal conductivities so arranged that the metals having the lower thermal conductivities contact the work piece at points spaced from the weld bead and the metal having the higher thermal conductivity is positioned adjacent the weld bead to assure the proper cooling of the weld bead before it is stressed by the contraction of the parent metal.

Additional objects and advantages will become apparent as the description proceeds in connection with the accompanying drawings in which:

FIGURE 1 is a top plan view of a preferred embodiment of the present invention; and FIGURE 2 is an end elevation of the apparatus of FIGURE 1.

Referring now more particularly to the drawings, the invention has been illustrated in an embodiment which is particularly suited for use with a conventional electric arc welding apparatus. Since the welding apparatus, apart from the work piece holder of the invention, is wholly conventional, it has not been illustrated in detail.

With continuing reference to the drawings, the apparatus of the invention includes a pair of upper clamps 20 and 22 which are normally fabricated from copper and are mounted on a suitable hydraulically or pneumatically operated mechanism for moving them toward and away from a fixed support and clamp assembly indicated generally at 24 which is rigidly mounted on a machine bed (not shown) in accordance with conventional well-known techniques.

The assembly 24 which also functions as an electrode has an elongated body 26 of copper along the length of which a central groove 28 extends. Received in the groove 28 is a back-up bar assembly 30 which forms an important part of the present invention. The back-up bar assembly 30 comprises a member 32 of solid copper which is notched as at 34 and 36 along its length. Rigidly mounted within the notches 34 and 36 and in full surface contact therewith are elongated bars 38 and 40 of a metal such as stainless steel which has a relatively low thermal conductivity. For example, bars 38 and 40 may be fabricated from type 310 stainless steel. As best shown in FIGURE 2 the bars 38 and 40 are of slightly greater height than the respective notches 34 and 36 so that the bars project slightly above the surface 42 of the portion of the copper body 32 which extends between the bars 38 and 40.

In a typical case the outer surfaces of the bars 38 and 40 project above the surface 42 a distance of about .007 inch. In this case the bar 32 is approximately ¾ inch on each side and the insert bars 38 and 40 are approximately ¼ inch square in section. It will also be noted that the surface 42 of the bar 32 as well as the surfaces of the inserts 38 and 40 project well above the surface of the electrode body 26 so that the electrode does not engage the work pieces. The electrode body is provided with a tube 43 through which hot or cold fluid may be passed to control the temperature of the back-up bar assembly.

Conventionally the clamps 20 and 22 are provided with flat surfaces 44 and 46 for engagement with the work piece. However, in accordance with the present invention, these surfaces are covered with stainless steel pads 48 and 50, respectively. While the pads 48 and 50 may be welded or otherwise secured to the clamps 20 and 22, preferably they are secured to the clamps by screws as at 52 since this construction is less expensive and permits replacement of the pads when required. Preferably the pads are type 310 stainless steel and are approximately .038 inch thick.

In operation the clamps 20 and 22 are raised away from the back-up bar assembly 30, the work pieces W1 and W2 are put in position in edge-to-edge relationship and the clamps 20 and 22 are forced downwardly onto the top surfaces of the work pieces to clamp them firmly in position. The usual electrode 54 mounted on a travelling head 56 is then caused to pass along the abutting edges of the work pieces and a weld bead is formed in the usual manner.

The lower surface of the bead contacts the adjacent surface 42 of the copper bar 32 and is cooled relatively rapidly. Because of the insulating effect of the stainless steel bars 38 and 40 and the pads 48 and 50 the weld tends to cool more rapidly at the welding bead than in the area adjacent the stainless steel parts contacting the work pieces. Actual experience has shown that the resulting welds are of high quality and substantially free of cracks and in production are subject to a very low rate of rejection. It is believed that the unexpected improvement over prior practice is due primarily to the fact that high stresses are not imposed on the weldment before it is cooled sufficiently to regain its normal strength.

The thermal conductivity of the copper bar 32 is approximately 28 times as great as the thermal conductivity of the stainless steel bars 38 and 40 and pads 48 and 50 which have been used with excellent results in practice. The ratio may have to be adjusted for other hot short alloys so as to obtain the most advantageous ratio of thermal conductivity between the bridge member and the inserted bars, as well as the upper pads. The preferred ratio in each case may be established empirically. While the exact ratio is not critical, nevertheless if metals or other materials having a significantly different thermal conductivity ratio are employed, the rate of cooling the weld bead will change, with consequent detrimental effect on the resulting weld.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for holding hot short sheet metal work pieces horizontally in edge-to-edge relation for welding comprising ferrous clamping members adapted to engage the upper face of said work pieces at regions spaced from and parallel to said edges, a back-up bar having a metallic body portion having a high thermal conductivity, a pair of ferrous clamp inserts mounted in said body and having a low thermal conductivity said inserts projecting above the surface of said metal body at areas opposite said clamping members for clamping engagement with the lower surfaces of said workpieces to maintain the metallic body portion of said back-up bar out of contact with said workpieces while permitting the weld bead to contact said body portion to cool said weld bead at an accelerated rate.

2. The apparatus according to claim 1 wherein the body portion of said back-up bar is copper and said clamping members and said clamp inserts are made of stainless steel.

References Cited in the file of this patent

UNITED STATES PATENTS

| | | |
|---|---|---|
| 1,840,737 | Peck | Jan. 12, 1932 |
| 2,146,600 | Somerville | Feb. 7, 1939 |
| 2,176,664 | Burke | Oct. 17, 1939 |
| 2,280,150 | Hasse et al. | Apr. 21, 1942 |
| 2,357,170 | Burggraf | Aug. 29, 1944 |
| 2,359,352 | Bucknam et al. | Oct. 3, 1944 |
| 2,393,198 | Somerville | Jan. 15, 1946 |